(No Model.)

B. ROBERTS.
SMOKE CONDENSER.

No. 386,498. Patented July 24, 1888.

Witnesses:
W. D. Harrington
Chas. H. Baker.

Inventor:
Benjamin Roberts
per C. & C. W. Bradford
his attorneys

N. PETERS, Photo-Lithographer, Washington, D. C.

United States Patent Office.

BENJAMIN ROBERTS, OF INDIANAPOLIS, INDIANA.

SMOKE-CONDENSER.

SPECIFICATION forming part of Letters Patent No. 386,498, dated July 24, 1888.

Application filed March 12, 1887. Serial No. 230,736. (No model.) Patented in England February 14, 1887, No. 2,316.

*To all whom it may concern:*

Be it known that I, BENJAMIN ROBERTS, of the city of Indianapolis, county of Marion, and State of Indiana, have invented certain new and useful Improvements in Smoke-Condensers, (for which I have obtained a patent in England February 14, 1887, No. 2,316,) of which the following is a specification.

My present invention consists in one feature shown and described in my application, Serial No. 217,773, filed November 2, 1886—viz., the central rotary water chamber or bulb, said bulb being an important feature of a smoke-condenser and capable of being used not only in the particular condenser shown in said application, but also in those of different construction. I therefore desire to claim the same in a separate application instead of in the application referred to.

Figure 1:
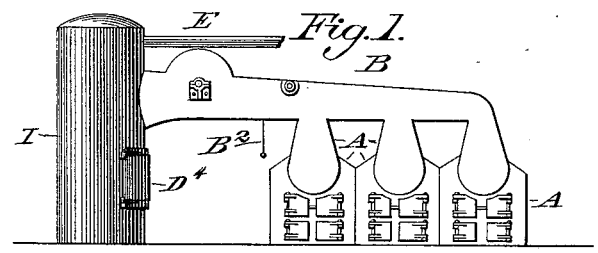
Figure 2:
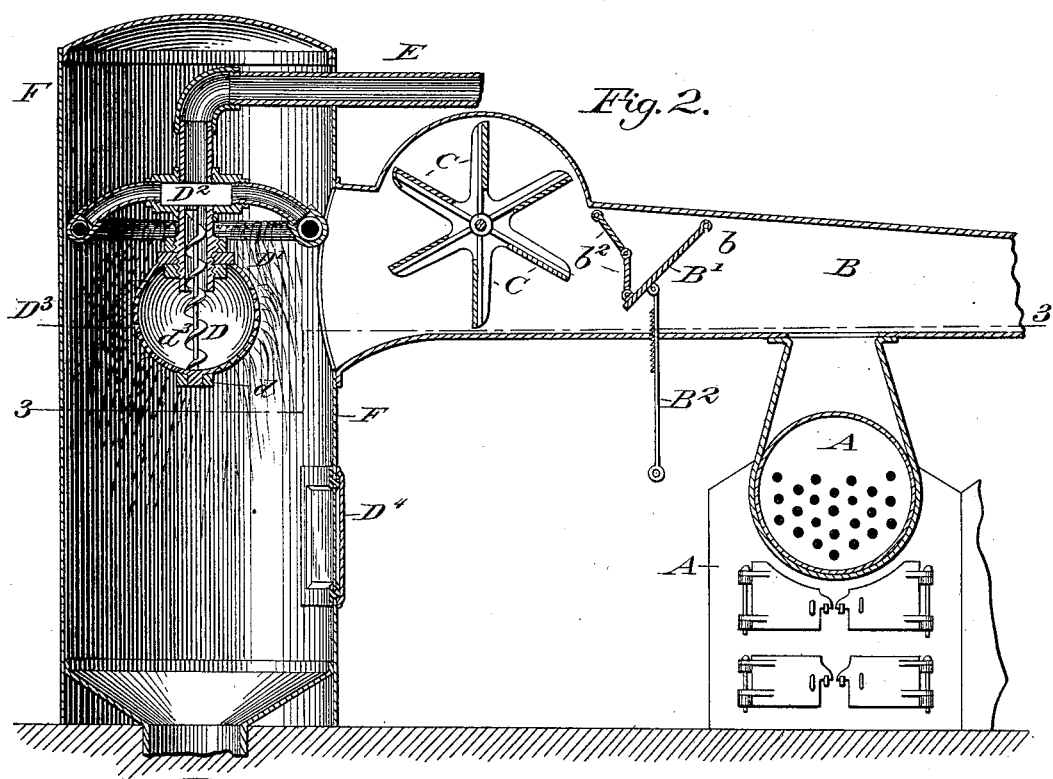
Figure 3:
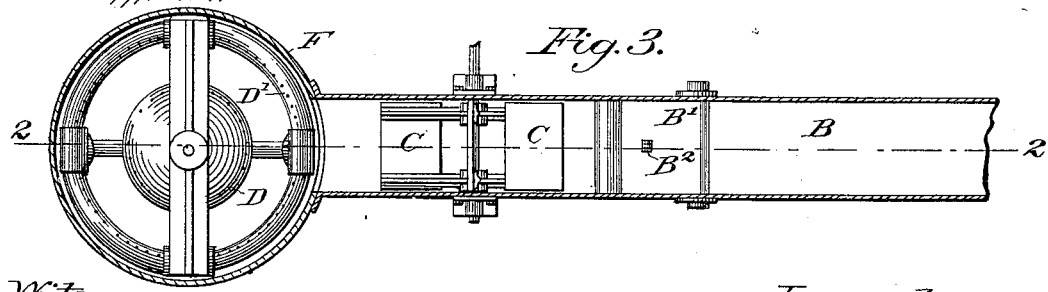

Referring to the accompanying drawings, which are made a part hereof, and on which similar letters of reference indicate similar parts, Figure 1 is a front elevation of a battery of steam boilers and accompanying furnaces provided with my said invention; Fig. 2, a central vertical section through said invention and extending to and including one of the boilers on the dotted line 2 2 in Fig. 3, on an enlarged scale; and Fig. 3, a horizontal sectional view looking upwardly from the dotted line 3 3 in Fig. 2.

In said drawings, the portions marked A represent the ordinary boilers and their furnaces; B, the breeching into which the products of combustion from the furnaces are immediately discharged; C, a fan for furnishing a draft to said furnaces; D, a water-chamber or central hollow portion, preferably in the form of a bulb or globe, and which is the feature of my present invention; E, a water-supply pipe leading thereto; and F, the casing or cylinder, which is the main structure of the condenser in which said bulb or globe is located.

All the parts shown are in all respects similar to those shown and described in my aforementioned application, and will not be further described herein, except the said water-chamber and the other parts adjacent thereto, which may be mentioned incidentally. Said water-chamber D is shown as connected to a central pipe, $D^2$, which, as well as a circular water-pipe, D', is suspended from the inner end of the water-supply pipe E. A cross-bar, $d$, is also preferably provided as a support below said chamber. Said water-chamber is preferably made to revolve, being suspended to the pipe $D^2$ in such a manner as to turn thereon, and the means for causing this rotary motion is preferably a central screw, $d^3$, secured fixedly internally to said chamber and extending up into the pipe $D^2$. The water, coming down through said pipe to the interior of the chamber, will cause the rotary motion, as will be easily understood. The chamber is provided with numerous orifices, through which the water is discharged in the form of fine streams or spray and serves to dampen everything inside the condenser effectually, being aided by the rotary motion in reaching every part of the interior of said condenser. A shaft to which power is applied might be substituted for the screw, and the chamber or globe thus turned, or it might be turned in a variety of other ways; but I regard the water-operated screw as preferable.

Having thus fully described my said invention, what I claim as new, and desire to secure by Letters Patent, is—

1. The combination, in a smoke-condenser, of a water-supply pipe, a chamber provided with numerous orifices and connected to said pipe, and a screw attached to said chamber and extending up into the portion of pipe which enters it, whereby said chamber will be given a rotary motion by the force of the water.

2. The combination, in a smoke-condenser, of a water-supply pipe leading to the interior of said condenser and a rotary hollow bulb or globe secured to its inner end and provided with orifices through which the water may discharge in the form of fine streams or spray.

In witness whereof I have hereunto set my hand and seal, at Indianapolis, Indiana, this 9th day of March, A. D. 1887.

BENJAMIN ROBERTS. [L. S.]

In presence of—
E. W. BRADFORD,
CHARLES L. THURBER.